(12) United States Patent
Clisby

(10) Patent No.: US 7,418,567 B2
(45) Date of Patent: Aug. 26, 2008

(54) CACHE FOR AN ENTERPRISE SOFTWARE SYSTEM

(75) Inventor: Peter Lee Clisby, North Yorkshire (GB)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 10/999,369

(22) Filed: Nov. 30, 2004

(65) Prior Publication Data

US 2006/0117146 A1    Jun. 1, 2006

(51) Int. Cl.
*G06F 12/00* (2006.01)
(52) U.S. Cl. .................. 711/170; 711/113; 711/118; 711/141
(58) Field of Classification Search .................. None
See application file for complete search history.

(56) References Cited

U.S. PATENT DOCUMENTS

| | | | |
|---|---|---|---|
| 6,182,151 B1 * | 1/2001 | Cheng et al. ............... | 719/310 |
| 6,209,057 B1 | 3/2001 | Ban et al. | |
| 6,292,880 B1 * | 9/2001 | Mattis et al. ............... | 711/216 |
| 6,453,321 B1 | 9/2002 | Hill et al. | |
| 6,542,967 B1 * | 4/2003 | Major ....................... | 711/134 |
| 6,732,239 B2 | 5/2004 | Weedon | |
| 7,269,705 B1 * | 9/2007 | Seidl et al. ................ | 711/170 |
| 2001/0021959 A1 | 9/2001 | Holmberg et al. | |
| 2004/0111728 A1 * | 6/2004 | Schwalm ................... | 719/316 |
| 2005/0102670 A1 * | 5/2005 | Bretl et al. ................ | 718/1 |

FOREIGN PATENT DOCUMENTS

JP    2001-109661    4/2001

OTHER PUBLICATIONS

International Search Report and Written Opinion from corresponding PCT Application Serial No. PCT/IB2005/004131 mailed Aug. 21, 2006 (15 pages).
International Preliminary Report on Patentability from corresponding PCT Application Serial No. PCT/IB2005/004131 mailed Jun. 14, 2007 (10 pages).

* cited by examiner

*Primary Examiner*—Jasmine Song
(74) *Attorney, Agent, or Firm*—Shumaker & Sieffert, P.A.

(57) ABSTRACT

Techniques are described for caching data from a software system, such as an enterprise software system. The techniques may be applied to a computing device connected to the software system via a network. In one example, the cache comprises an elegant, file-based cache that includes an object store that stores the cached data and an allocation table that manages allocation of space in the object store. The caching techniques provide a robust storage system which preserves a previous copy of the allocation table while updating the current table. Moreover, cache management techniques are described that utilize an automatic collapse to keep cache file sizes to a minimum. When multiple software applications are executing on the computing device, the techniques allow concurrent access to the cache by the multiple software applications while maintaining the integrity of the stored data.

35 Claims, 9 Drawing Sheets

CACHE FOR AN ENTERPRISE SOFTWARE SYSTEM

TECHNICAL FIELD

The invention relates to software systems and, in particular, techniques for caching data from an enterprise software system.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligent tools, enterprise reporting tools, project and resource management systems and other enterprise software systems.

A user may be connected to the enterprise software system via a network. Typically, a user device includes at least one cache to store data requested by the user. In this way, system performance can be improved since future requests for data can be fulfilled locally from the cache without having to repeatedly retrieve the same data from the enterprise software system. Many conventional caching approaches are complex and utilize database applications, such as Access™ from Microsoft Corporation of Redmond, Wash.

In some environments, the user device may concurrently run several software applications, such as modeling tools and reporting tools, in the case of an enterprise planning system. In that case, the cache must be capable of handling concurrent data requests from the multiple software modules. However, conventional caching techniques often have difficulties dealing with software module contention or do not allow concurrent access to the cache at all. Furthermore, as the cache continues to store retrieved data, the large amount of storage space required by the cache may disrupt operation of the user device, often requiring the user to intervene to reduce the size of the cache.

SUMMARY

In general, the invention is directed to techniques for caching data from a software system, such as an enterprise software system. For example, the techniques provide efficient storage and retrieval of data in an elegant, file-based cache. The cache includes an object store that stores the cached data and an allocation table that manages allocation of space in the object store. The techniques provide a robust storage system which preserves a previous copy of the allocation table while updating the current table. Moreover, the techniques include automatic collapse to keep cache file sizes to a minimum.

As an example, the techniques may be applied to a computing device connected to the enterprise software system via a network. When software modules executing on the computing device request data from the software system, the data is stored locally in a cache, as described herein. In this way, system performance may be improved as the cache allows the computing system to locally fulfill future requests for previously requested data without having to repeatedly retrieve the same data from the remote enterprise software system.

Multiple software applications may be executing on the computing device. The techniques allow concurrent access to the cache by the multiple software applications while maintaining the integrity of the stored data. For example, the cache provides a mutual exclusion object (mutex) to ensure that each software application retrieves current data from the cache.

In one embodiment, a computer-implemented system comprises a cache and a plurality of software applications. The cache includes an object store to store data and a plurality of allocation tables to manage allocation of storage space in the object store; the allocation tables include an active allocation table and at least one inactive allocation table. The plurality of software applications executing within an operating environment of a computer utilize the active allocation table to access cached data in the object store.

In another embodiment, a method comprises storing data in an object store of a cache on a computing device and managing allocation of storage space in the object store with a plurality of allocation tables. The allocation tables comprise an active allocation table and at least one inactive allocation table. The method further comprises executing a plurality of software applications on the computing device, wherein the plurality of software applications utilize the active allocation table to access cached data in the object store. The method also includes switching the active allocation table to a next one of the allocation tables after a cache operation by one of the plurality of software applications.

In a further embodiment, a computer-readable medium comprises instructions that cause a programmable processor of a computing device to store data in an object store of a cache on a computing device and manage allocation of storage space in the object store with a plurality of allocation tables, wherein the allocation tables comprise an active allocation table and at least one inactive allocation table. The instructions also cause the programmable processor to execute a plurality of software applications on the computing device, wherein the plurality of software applications utilize the active allocation table to access cached data in the object store, and switch the active allocation table to a next one of the allocation tables after a cache operation by one of the plurality of software applications.

In another embodiment, a computer-implemented system comprises a cache and a plurality of software applications. The cache includes an object store and an allocation table. The object store stores data allocations and key allocations and each of the key allocations includes a link table to associate the key allocation with one of the data allocations. The plurality of software applications utilize the allocation table to access the cached data in the object store.

In an additional embodiment, a method comprises storing data in an object store of a cache on a computing device and storing a key in the object store of the cache. The object store stores the data and the key as separate allocations and the key allocation includes a link table to associate the key allocation with the data allocation. The method further comprises managing the allocations in the object store with an allocation table of the cache and executing a plurality of software applications on the computing device. The software applications utilize the allocation table to access the cached data in the object store.

In a further embodiment, a computer-readable medium comprising instructions that cause a programmable processor of a computing device to store data in an object store of a cache on a computing device and store a key in the object store of the cache, wherein the object store stores the data and the key as separate allocations and the key allocation includes a link table to associate the key allocation with the data allocation. The instructions also cause the programmable processor to manage the allocations in the object store with an allocation table of the cache and execute a plurality of software applications on the computing device, wherein the software applications utilize the allocation table to access the cached data in the object store.

In another embodiment, an enterprise planning system comprises a remote database system and a computing device. The database system stores modeling data defining a plurality of nodes and enterprise planning data associated within each of the nodes. The computing device includes a plurality of enterprise planning software applications and a cache that comprises an object store and an allocation table. The enterprise planning software applications access the enterprise planning data and perform an enterprise planning session. The cache stores the enterprise planning data retrieved from the remote database system for use by the enterprise planning software applications.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
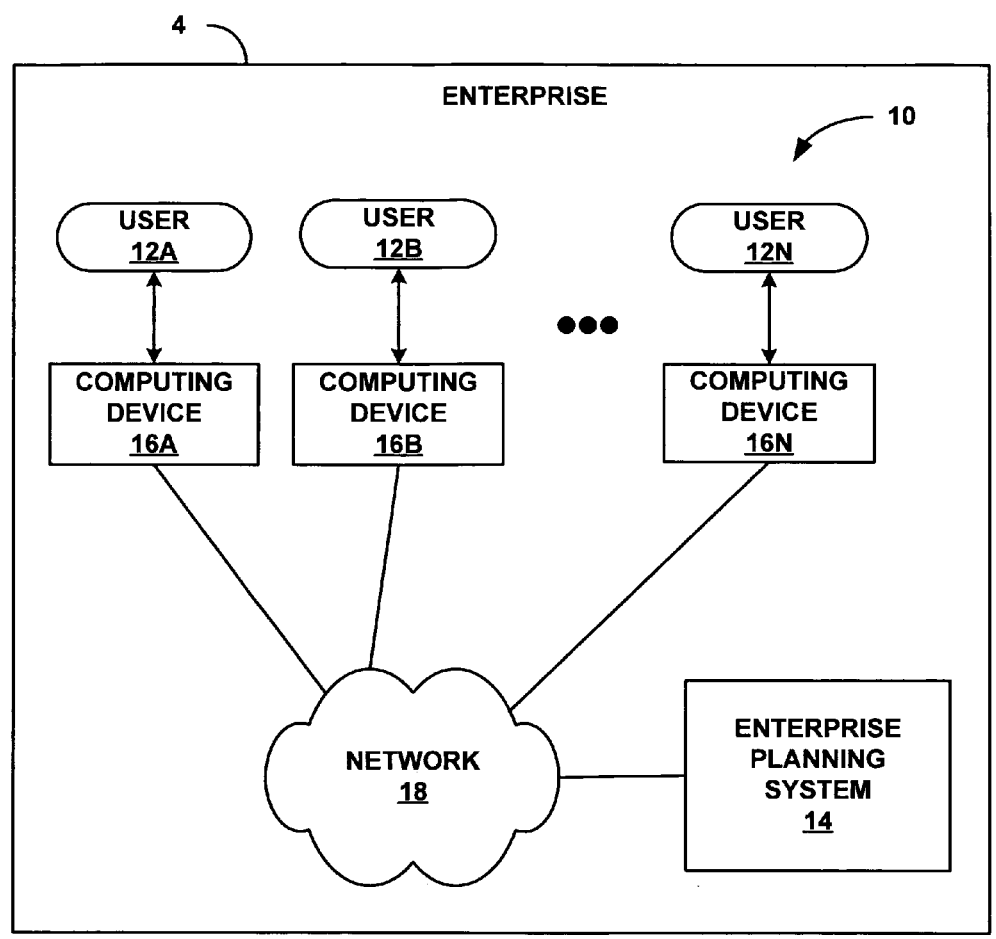
FIG. 1 is a block diagram illustrating an example computing environment in which a plurality of users interact with an enterprise planning system that enables and automates the reconciliation of top-down targets with detailed bottom-up forecasts.

FIG. 1 is a block diagram illustrating an example enterprise 4 having a computing environment 10 in which a plurality of users 12A-12N (collectively, "users 12") interact with an enterprise planning system 14. In the system shown in FIG. 1, enterprise system 14 is communicatively coupled to a number of computing devices 16A-16N (collectively, "computing devices 16") by a network 18. Users 12 interact with their respective computing devices to access enterprise planning system 14.

For exemplary purposes, the invention will be described in reference to an enterprise planning system, such as an enterprise financial or budget planning system. The techniques described herein may be readily applied to other software systems, including other large-scale enterprise software systems. Examples of enterprise software systems include order management systems, inventory management systems, sales force management systems, business intelligent tools, enterprise reporting tools, project and resource management systems and other enterprise software systems.

In general, enterprise planning system 14 enables and automates the reconciliation of top-down targets with detailed bottom-up forecasts for an enterprise. Enterprise planning system 14 implements and manages an enterprise planning process, which can be divided into three functions: (1) modeling, (2) contribution, and (3) reconciliation.

Initially, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts specify corporate target data for each node of the organizational hierarchy. Corporate target data may include financial data, revenue data, order data, inventory data, and the like, depending on the particular enterprise planning activity being carried out by the enterprise. The analysts then assign one or more enterprise users to each node, such as managers, supervisors, sales representatives, lab managers, or the like, that are responsible for enterprise planning for the cost center corresponding to the node. Each enterprise user may be designated as a contributor that provides planning data to enterprise planning system 14, a reviewer that accepts or rejects contributions from the contributors, or both. The contributors and reviewers may be authorized users within the enterprise or within other entities coupled to network 18, such as suppliers or customers.

Next, enterprise users 12 that are designated as contributors interact with enterprise planning system 14 to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise planning system 14 automates the reconciliation of the forecast data with the corporate target data provided by the analysts. In particular, enterprise planning system 14 operates in accordance with a defined model, i.e., the enterprise planning model created by the analysts, to provide a hierarchical planning process having multiple reconciliation levels. As each of the contributors provides his or her contribution data, enterprise planning system 14 automatically aggregates the contribution data across the enterprise in real-time, and provides access to the aggregated data to enterprise users 12 designated as reviewers associated with higher levels of the enterprise. In particular, upon receiving contribution data from the contributors, enterprise planning system 14 identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise planning system 14 ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise planning system 14 may provide more accurate enterprise planning than with conventional techniques. For example, enterprise planning system 14 may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise planning system 14 can aggregate contribution data in real-time, all users 12 can be presented with an accurate, up-to-date view of the numbers. Further, the architecture of enterprise planning system 14 can readily scale to thousands of users, and may be designed around best planning practices. In addition, the techniques enabling high participation by enterprise users 12, i.e., the contributors and reviewers, allowing accurate planning cycles to be reduced Enterprise users 12 may use a variety of computing devices to interact with enterprise planning system 14 via network 18. For example, an enterprise user may interact with enterprise planning system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise planning system 14 via a local area network, or may remotely access enterprise planning system 14 via a virtual private network, remote dial-up, or similar remote access communication mechanism.

Enterprise planning system 14 may utilize a "cut-down" process by which the multidimensional data store is "sliced" for each user 12 in accordance with the defined enterprise model. During this process, enterprise planning system 14 identifies areas of the defined model to which users 12 are assigned, either as contributors or reviewers, and "slices" the data store based on the assignments. When a given user 12 logs in and proceeds with an enterprise planning activity, enterprise planning system 14 communicates the respective data slice to the respective computing device 16 for display to the user via the extended spreadsheet application. In this fashion, enterprise planning system 14 need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

As described herein, each of computing devices 16 may maintain at least one cache (not shown in FIG. 1) to locally store data requested by corresponding user 12 from enterprise planning system 14. In accordance with the techniques described herein, each computing device 16 provides efficient storage and retrieval of data from the cache, which may be implemented in one embodiment as a file-based cache. As further described, the cache includes an object store to store the cached data. In one embodiment, the object store links the stored data with keys, and further includes one or more allocation tables that manage the allocation of space within the object store. In some embodiments, enterprise planning system 14 may also utilize the techniques described herein to implement an efficient caching scheme.

The caching techniques, described in more detail below, provide a robust storage system, and may automatically collapse the cache as needed to keep cache size to a minimum. Moreover, the client-side caches implemented on computing devices 16 support concurrent access by multiple software applications that may be executing on each of the computing devices while maintaining the integrity of the stored data.

Figure 2:
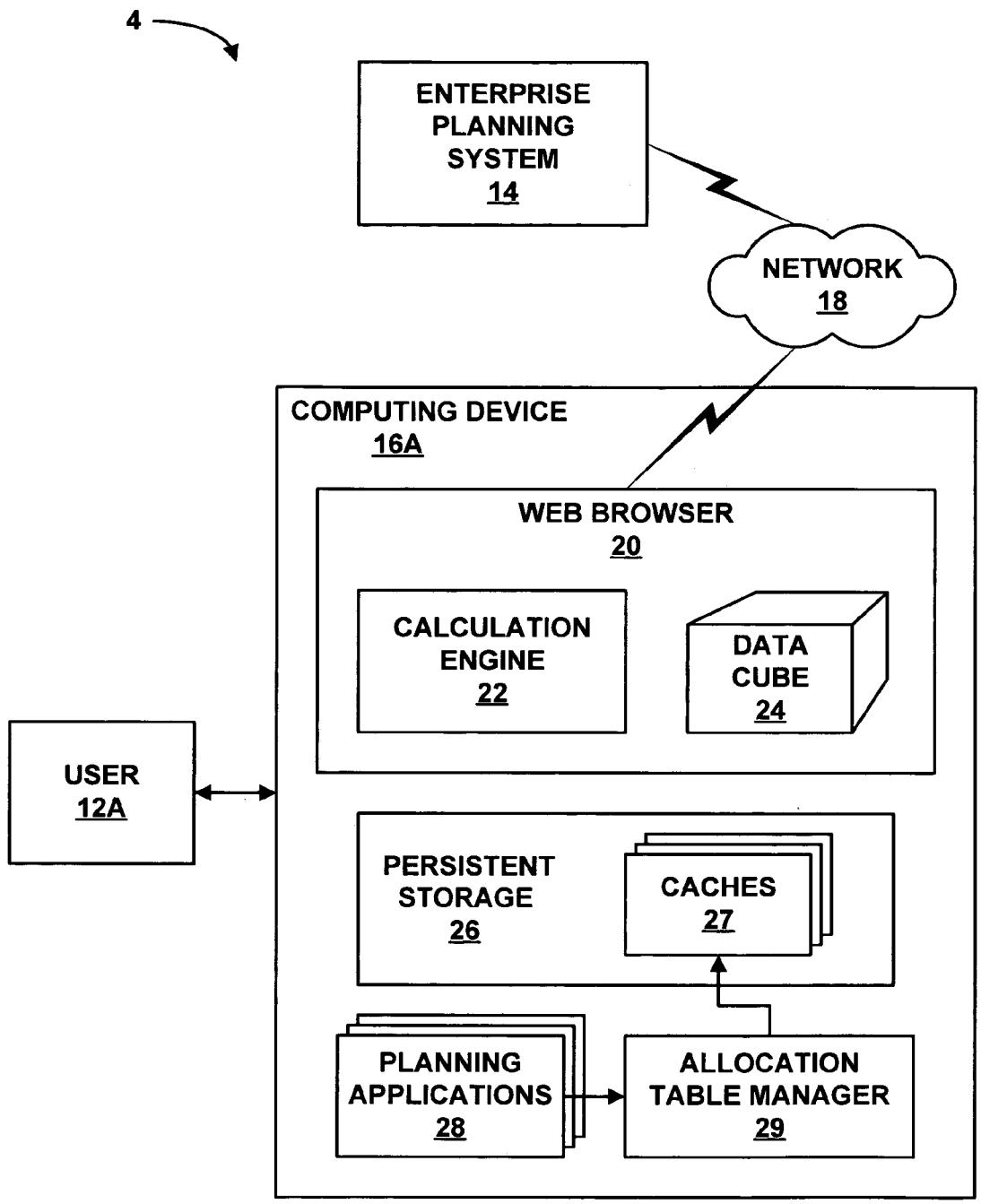
FIG. 2 is a block diagram illustrating one embodiment of a remote computing device for interacting with the enterprise planning system of FIG. 1.

FIG. 2 is a block diagram illustrating one embodiment of a computing device 16A for interacting with enterprise planning system 14. In the exemplary embodiment, computing device 16A includes a web browser 20, a persistent storage 26, one or more planning applications 28 and an allocation table manager 29. Calculation engine 22 and data cube 24 are installed within web browser 20 for use during the enterprise planning session.

Persistent storage 26 includes a plurality of caches 27 such that data required during the planning session may be locally cached. Persistent storage 26 may comprise a persistent computer-readable medium. In this way, caches 27 allow computing system 16A to locally fulfill future requests for the cached data without having to repeatedly retrieve the same data from enterprise planning system 14 or data cube 24.

In one embodiment, calculation engine 22 comprises a forward calculation engine 22 wrapped in an Active X object built in an array-based language. In the example of enterprise planning, user 12A may interact with web browser 20 to enter and manipulate budget or forecast data. Data cube 24 contains planning data, which may include top-down targets, and bottom-up contribution data, and allows all calculations for an enterprise planning session to be performed locally by computing device 16A. Therefore, in this example, a contributor can modify his or her respective contribution data, and perform calculations necessary for the enterprise planning process without necessarily accessing enterprise planning system 14. In other words, calculation engine 22 and data cube 24 may be maintained locally (e.g., as ActiveX components) via computing device 16A. User 12A may save the planning data locally, and submit the planning data to enterprise planning system 14 for aggregation with the planning data from other users 12. Enterprise planning system 14 automatically aggregates the contribution data across enterprise 4 in real-time, and provides access to the aggregated data to reviewers associated with higher levels of the enterprise. This process continues until the contribution data is ultimately approved by the reviewers associated with the highest level of the organizational hierarchy, thereby ensuring that the contribution data from the contributors reconciles with corporate targets. In other embodiments, calculation engine 22 and data cube 24 may be maintained only at enterprise planning system 14 and installed locally upon computing devices 16.

Planning applications 28 represent software applications that may be simultaneously executing on computing device 16A. For example, planning applications 28 may include reporting tools, modeling tools, spreadsheet applications, data collection templates, business intelligence tools, or other types of enterprise planning applications.

As illustrated in FIG. 2, computing device 16A includes caches 27 to locally store data requested by planning applications 28 or user 12A, e.g., data requested from enterprise planning system 14 or data cube 24. Examples of caches 27 include an online cache for storing data used by on-line planning applications, an offline cache for storing data used by offline planning applications, an extension cache for storing data used by software extensions, and a "jce" cache that is used to store data used by calculation engine 22.

Computing device 16A provides efficient storage and retrieval of data from caches 27. For example, caches 27 may be implemented as file-based caches, which are not dependent on database applications, such as Microsoft Access. Therefore, caches 27 may allow for more elegant caching techniques and comprise a smaller footprint than conventional caches.

The cache management techniques applied to caches 27 provide a robust storage system, and may automatically collapse caches 27 as needed to keep cache file sizes to a minimum. Computing device 16A may initiate a collapse when either the number of files within one of caches 27 or the overall size of the cache reaches an upper limit. User 12A may set the upper limit. In other cases, computing device 16A may set the upper limit based on the amount of free space available on computing device 16A. User 12A may also be able to initiate a collapse of one or more of caches 27 at any time. Collapsing one of caches 27 in effect "cleans up" the cache by removing unused space and reorganizing the file structure to minimize the overall size of the cache.

The caching management techniques allow concurrent access to caches 27 by planning applications 28. In order for each of the planning applications 28 to concurrently access caches 27, each of caches 27 may comprise a mutual exclusion object (mutex). The mutex allows one of the planning applications to lock one of caches 27 from the other planning applications while accessing the cache. In this way, the caching management techniques ensure that each of planning applications 28 retrieves current data from caches 27.

Computing device 16A also includes allocation table manager 29. As described in more detail below, each of caches 27 includes an object store to store the cached data and link the cached data with keys. Each of caches 27 also includes an allocation table that manages the allocation of space in the object store. Each of planning applications 28 may utilize allocation table manager 29 to create an instance of the allocation table from each of caches 27. In addition, allocation table manager 29 provides an application programming interface (API), which communicates cache operations to caches 27. Planning allocations 28 execute the cache operations on the allocation table within each of caches 27.

In some embodiments, persistent storage 26 may include one or more plug-ins (not shown), applied to caches 27 to execute data transformations before the data is persisted to disk. One plug-in may comprise a compression module for automatically compressing the cached data, and decompressing the data when requested by user 12A. In this way, additional caching may occur since compressing the data relinquishes storage space in caches 27. Therefore, a compression plug-in may enable computing device 16A to collapse caches 27 less frequently. Another plug-in may comprise an encryption module for automatically encrypting the cached data and decrypting the data when requested by user 12A. In some cases, persistent storage 26 includes two or more plug-ins to apply to caches 27. In that case, the two or more plug-ins execute in reverse order when retrieving data than when storing data in caches 27.

Figure 3:
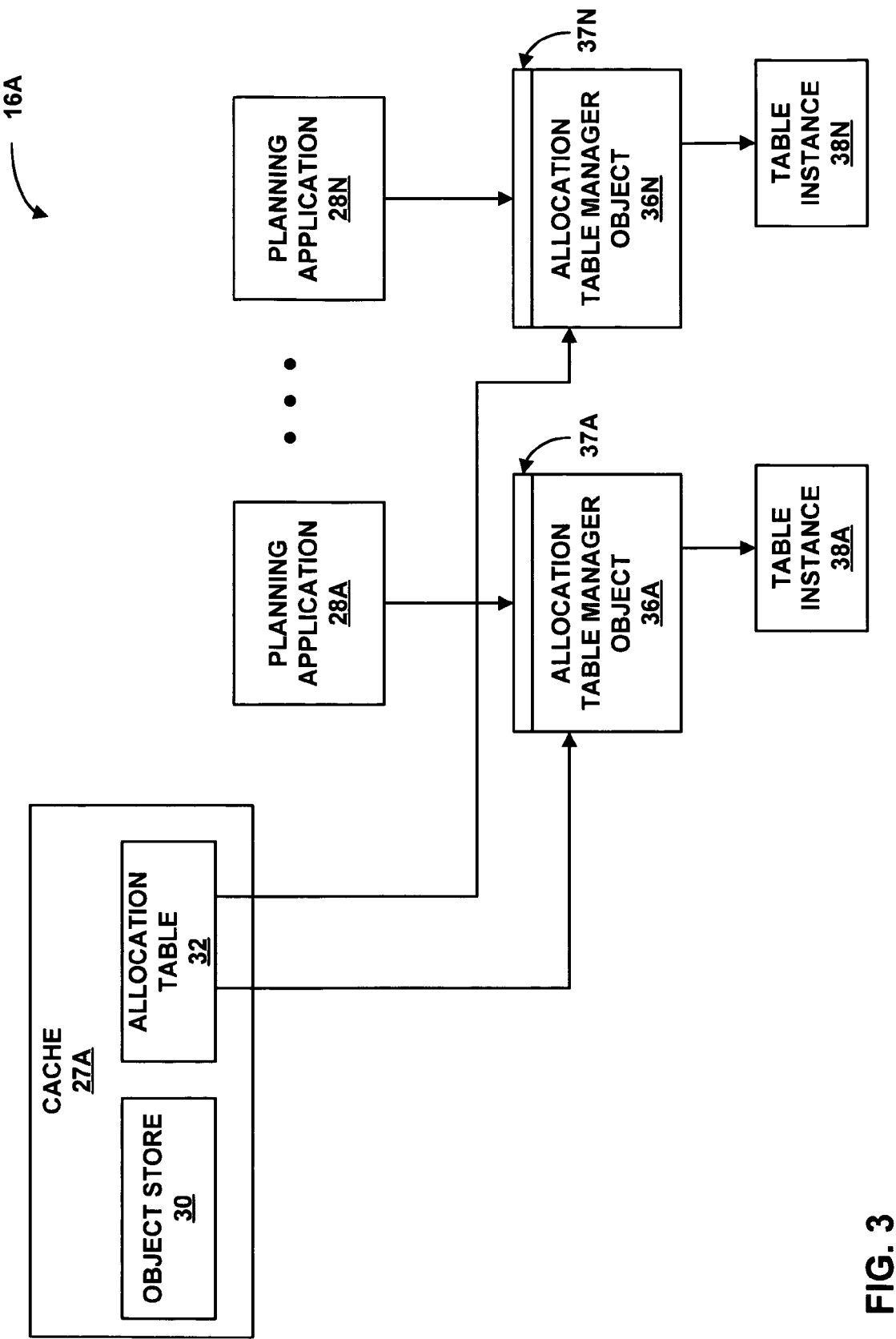
FIG. 3 is a block diagram illustrating portions of the computing device from FIG. 2 in further detail.

FIG. 3 is a block diagram illustrating portions of computing device 16A in further detail. For purposes of illustration, FIG. 3 shows planning applications 28 connecting to a single cache. In other embodiments, each of planning applications 28 may connect to a plurality of caches. As illustrated in FIG. 3, a cache 27A (e.g., one of caches 27 from FIG. 2) comprises a file-based cache that includes an object store 30 and an allocation table 32. Object store 30 stores the cached data and allocation table 32 manages the allocation of space in object store 30. In one example, the space allocations within object store 30 may store key objects, data objects or metadata objects.

Each allocation listed in allocation table 32 corresponds to an allocation of space within object store 30, and includes a set of properties associated with the allocation. For example, allocation table 32 may include an offset of the allocation from a first allocation, a size of the allocation, an amount of free space in the allocation, and an indication of whether the allocation is active or inactive. Each key object stored in object store 30 may include a link table or other data to associate the key with a corresponding cached data object stored elsewhere in object store 30. In some cases, the link table also associates the key with one or more corresponding metadata objects. The link table may reference allocation table 32 in order to determine an offset of the desired data object. The offset may then be used to locate the data object within object store 30. In this way, cache 27A utilizes an elegant and efficient file-based caching process.

Allocation table manager 29 may, for example, comprise a dynamic link library (DLL) that includes an allocation table manager class. Each of planning applications 28 may instantiate a respective allocation table manager object 36 of the allocation table manager class. Allocation table manager objects 36A-36N (collectively, "allocation table manager objects 36") each expose an application programming interface (API) by which planning applications 28 interact with cache 27A.

In the illustrated embodiment, the APIs comprise communication interfaces 37A-37N (collectively, "communication interfaces 37"). Communication interfaces 37 communicate connect and disconnect requests as well as cache operations from corresponding planning applications 28 to cache 27A. Examples of cache operations available via communication interfaces 37 include select, insert, update, remove and shrink. Allocation table manager objects 36 execute the cache operations on allocation table 32. For example, selecting an allocation for use by one of planning applications 28, inserting a new allocation, updating an existing allocation, removing an allocation (i.e., marking an allocation inactive) or collapsing allocation table 32.

In order to connect planning application 28A, for example, to cache 27A, communication interface 37A receives information from cache 27A and uses the information to establish the connection. Planning application 28A may remain connected to cache 27A even when not accessing cache 27A. Therefore, each of planning applications 28 may be simultaneously connected to cache 27A. Once planning applications 28 are connected to cache 27A, allocation table manager objects 36 may respectively create table instances 38A-38N (collectively, "table instances 38") of allocation table 32 from cache 27A. Each of allocation table manager objects 36 reads the contents of allocation table 32 into memory associated with corresponding planning applications 28.

Prior to executing cache operations on allocation table 32, allocation table manager object 36A compares table instance 38A with allocation table 32 for discrepancies. Allocation table 32 may include a global unique identifier (guid) within a header that changes each time a modification occurs in allocation table 32. If the guid associated with table instance 38A does not match the guid associated with allocation table 32, allocation table manager object 36A updates table instance 38A. Each allocation within allocation table 32 may also include a guid. The guid associated with a particular allocation may be compared to the guid of the corresponding allocation within table instance 38A. Therefore, allocation table manager object 36A may reload only those allocations that are different between the two files, i.e., a warm load. However, in some cases allocation table manager object 36A may reload the entire allocation table 32 into table instance 38A, i.e., a cold load.

Allocation table manager object 36A may then execute cache operations from software application 28A based on table instance 38A to modify data stored in object store 30 within cache 27A. The cache operations may comprise atomic operations, which open, modify, and close allocation table 32 for each cache operation performed on table instance 38A.

In order to allow concurrent access to cache 27A by planning applications 28, application table manager objects 36 utilize a shared mutex to control access to the cache. The mutex allows one of planning applications 28 to lock cache 27A from the other planning applications while accessing cache 27A. In this way, the caching management techniques ensure that each of planning applications 28 retrieves current data from cache 27A.

Figure 4:
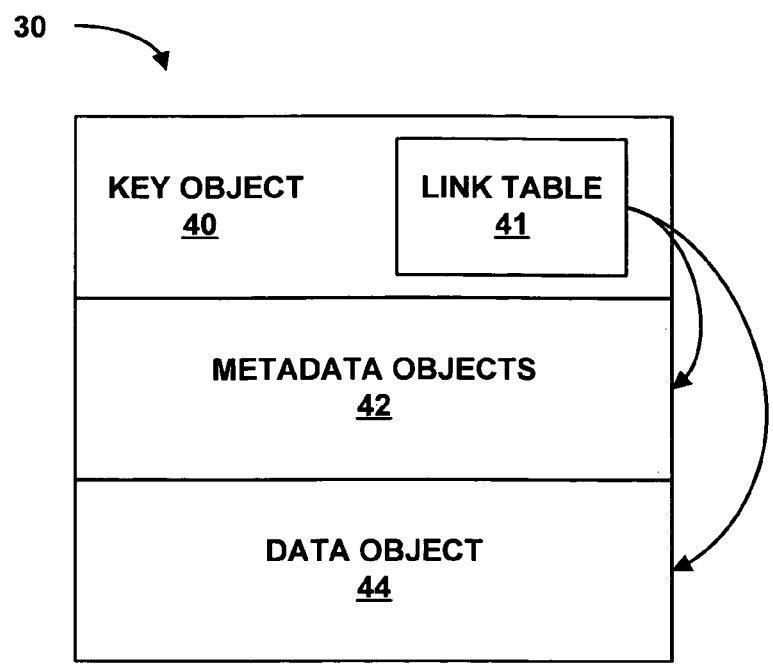
FIG. 4 illustrates an object store maintained by the computing device to cache data.

FIG. 4 illustrates one embodiment of object store 30 from FIG. 3 in greater detail. In the illustrated embodiment, object store 30 comprises allocations storing a key object 40, metadata objects 42, and a data object 44. Key object 40 includes data defining a link table 41 that associates the key with corresponding cached data object 44. Link table 41 also links key 40 with up to fourteen corresponding metadata objects 42.

Figure 5:
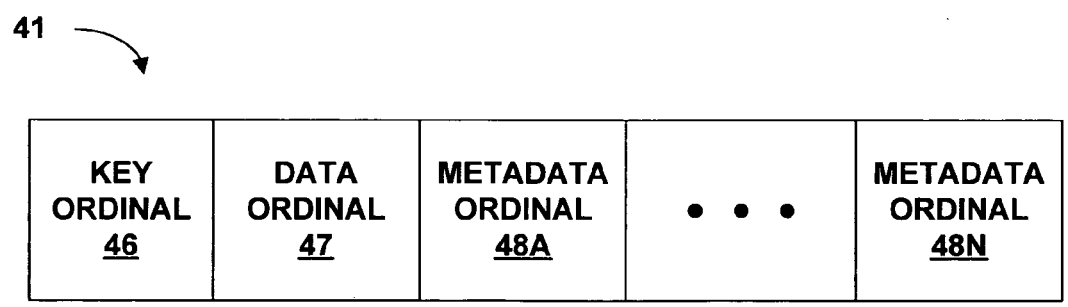
FIG. 5 illustrates a link table included in the object store of FIG. 4 in greater detail.

FIG. 5 illustrates one embodiment of link table 41 from FIG. 4 in greater detail. Link table 41 associates key object 40 with metadata objects 42 and data object 44 by providing ordinals that identify the respective allocation entries for each object within allocation table 32. In other words, the ordinals identify the allocation entries within allocation table 32 that identify the properties (e.g., offset and size) for each of the corresponding allocations within object store 30. In this manner, link table 41 effectively "links" key object 40, metadata objects 42 and data objects 44. In this example, link table 41 includes a key ordinal 46, a data ordinal 47, and metadata ordinals 48A-48N (collectively, "metadata ordinals 48"). In some cases, no metadata objects 42 may link to key object 40; therefore, link table 41 would contain null data for metadata ordinals 48. In other cases, up to fourteen metadata objects may link to key object 40. In that case, up to fourteen metadata ordinals 48 may be included in link table 41.

Each of key object 40, metadata objects 42, and data object 44 are cached in object store 30 as separate allocations. In order for planning applications 28 to retrieve data object 44, allocation table manager objects 36 traverse through the allocations in object store 30 to find key object 40. If the allocation is active and includes key object 40, allocation table manager objects 36 use link table 41 to determine data ordinal 47. Allocation table manager object 36 then use data ordinal 47 to locate the corresponding allocation listing in allocation table 32. The allocation listing may include an offset of the desired data object 44. Allocation table manager objects 36 then use the offset to recover data object 44 from object store 30.

Figure 6:
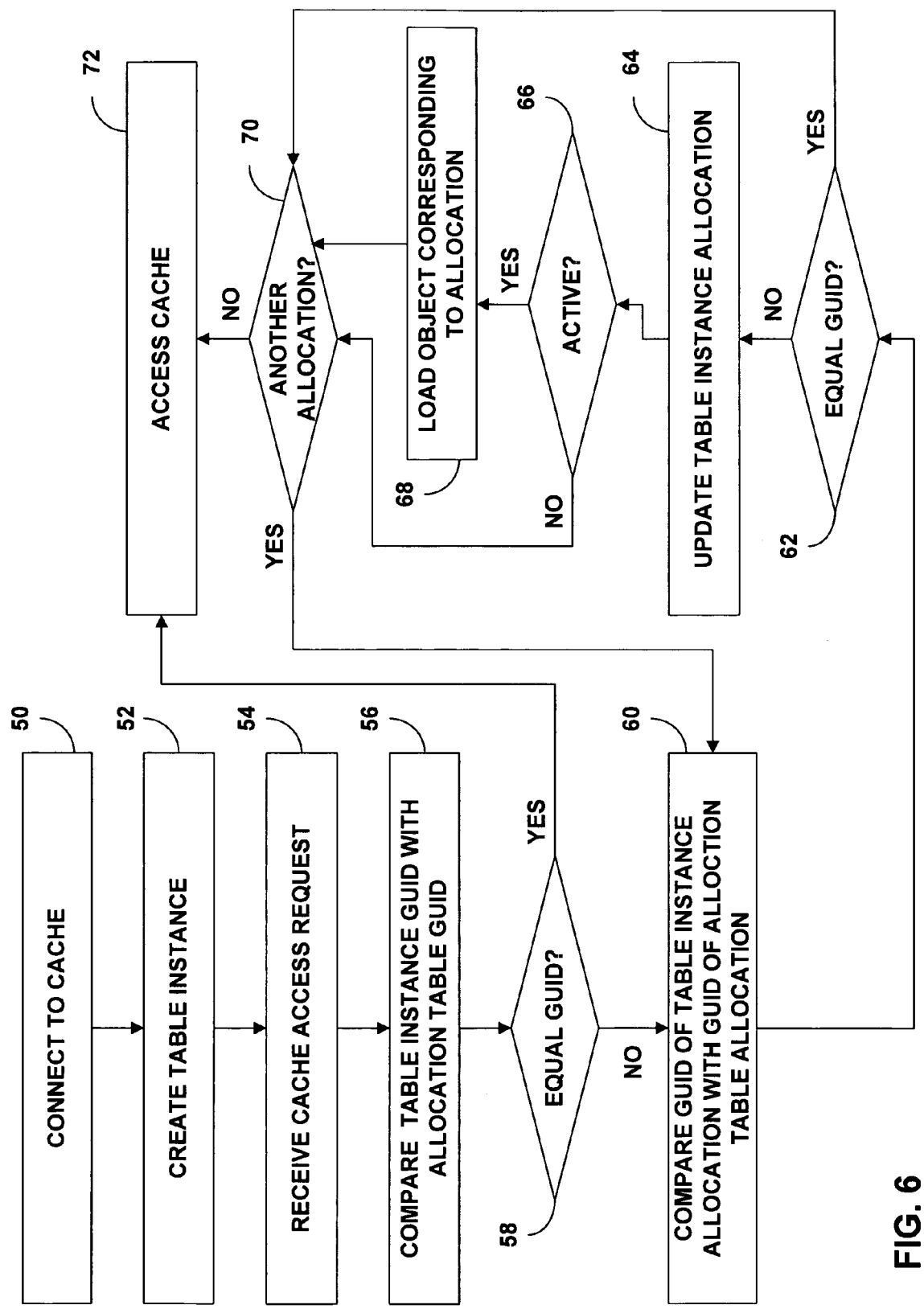
FIG. 6 is a flow chart illustrating exemplary operation of the components illustrated in FIG. 3.

FIG. 6 is a flow chart illustrating exemplary operation of the components illustrated in FIG. 3. Initially, one or more of planning applications 28 connect to cache 27A by instantiating table manager objects 36 and invoking a connect method exposed by the corresponding communication interfaces 37 (50). At this time, allocation table manager objects 36 create table instances 38 in memory from allocation table 32 within cache 27A, which may be stored in a file (52).

Next, any of allocation table manager objects 36 may receive a cache operations from the respective one of planning applications 28, e.g., planning application 28A, for execution on allocation table 32 (54). Examples of cache operations include select, insert, update, remove, and shrink. Prior to executing the cache operation, allocation table manager object 36A, in this example, opens allocation table 32 and reads a header of allocation table 32. As described above, allocation table 32 may include a guid within the header that changes each time a modification occurs in allocation table 32. Allocation table manager object 36A then compares the guid of table instance 38A with the guid of allocation table 32 (56).

If the table instance guid is equal to the allocation table guid (yes branch of 58), allocation table manager 36A may access cache 27A (72). In other words, when table instance 38A is current with allocation table 32, allocation table manager 36A may execute cache operations based on table instance 38A to modify data stored in object store 30 within cache 27A. The cache operations may comprise atomic operations, which open, modify, and close allocation table 32 for each cache operation performed on table instance 38A.

If the table instance guid does not equal the allocation table guid (no branch of 58), allocation table manager object 36A reads the header of each allocation within allocation table 32. Each allocation in allocation table 32 may also include a guid within the header that changes each time a modification occurs to the allocation. Allocation table manager object 36A then compares the guid of a table instance allocation with the guid of a corresponding allocation table allocation (60). This enables allocation table manager object 36A to only reload the modified allocations to table instance 38A. In some cases, allocation table manager object 36A may be unable to perform a warm load of allocation table 32 to table instance 38A. Instead, allocation table manager object 36A may clear table instance 38A and perform a cold load of allocation table 32.

If the table instance allocation guid is equal to the allocation table allocation guid (yes branch of 62), allocation table manager object 36A reads the header of the next allocation in allocation table 32 (yes branch of 70, 60). When all the allocations within allocation table 32 have been compared to the allocation within table instance 38A (no branch of 70), allocation table manager object 36A accesses cache 27A (72).

If the header for any table instance allocation is not equal to the allocation table allocation header (no branch of 62), allocation table manager object 36A updates the allocation in table instance 38A (64). When an active allocation is updated in table instance 38A (yes branch of 66) allocation table manager object 36A loads the object corresponding to the allocation (68). The object may comprise a key object, a data object, or a metadata object. Once the object is loaded into table instance 38A or if the updated allocation is not active (no branch of 66), allocation table manager object 36A reads the header of the next allocation in allocation table 32 (yes branch of 70, 60). Once all the allocations have been compared (no branch of 70), allocation table manager object 36A access cache 27A and performs the requested operation based on the updated table instance 38A (72).

In this way, allocation table manager objects 36 ensure that table instances 38 contain current allocations without necessarily having to completely reload allocation table 32 to table instances 38. Moreover, planning applications 28 may execute atomic cache operations via allocation table manager objects 36A based on up-to-date table instances 38, which modify object store 30 and allocation table 32 within cache 27A.

Figure 7:
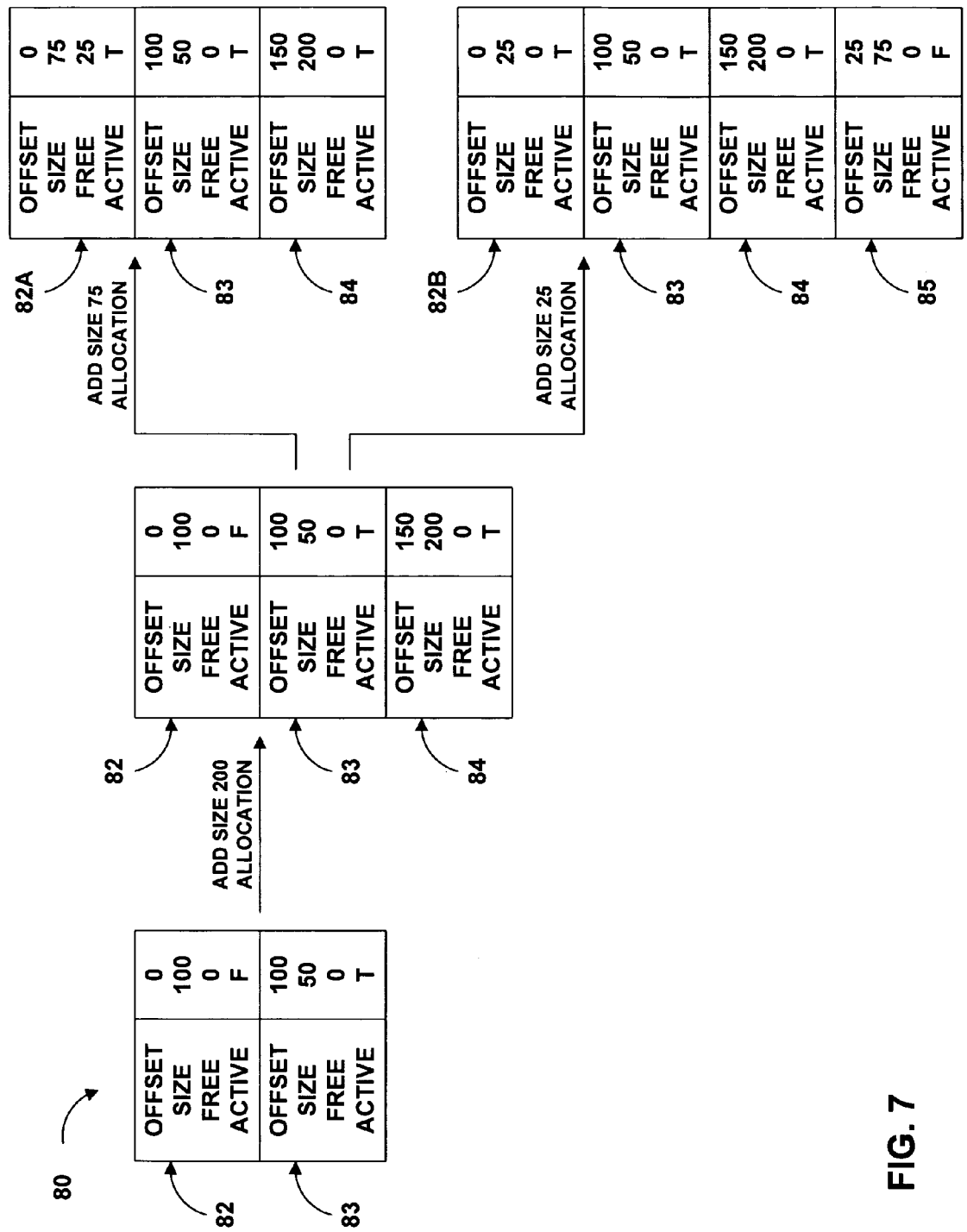
FIG. 7 illustrates an exemplary allocation table of a cache, as described herein, which allocates space on a corresponding object store.
Figure 8:
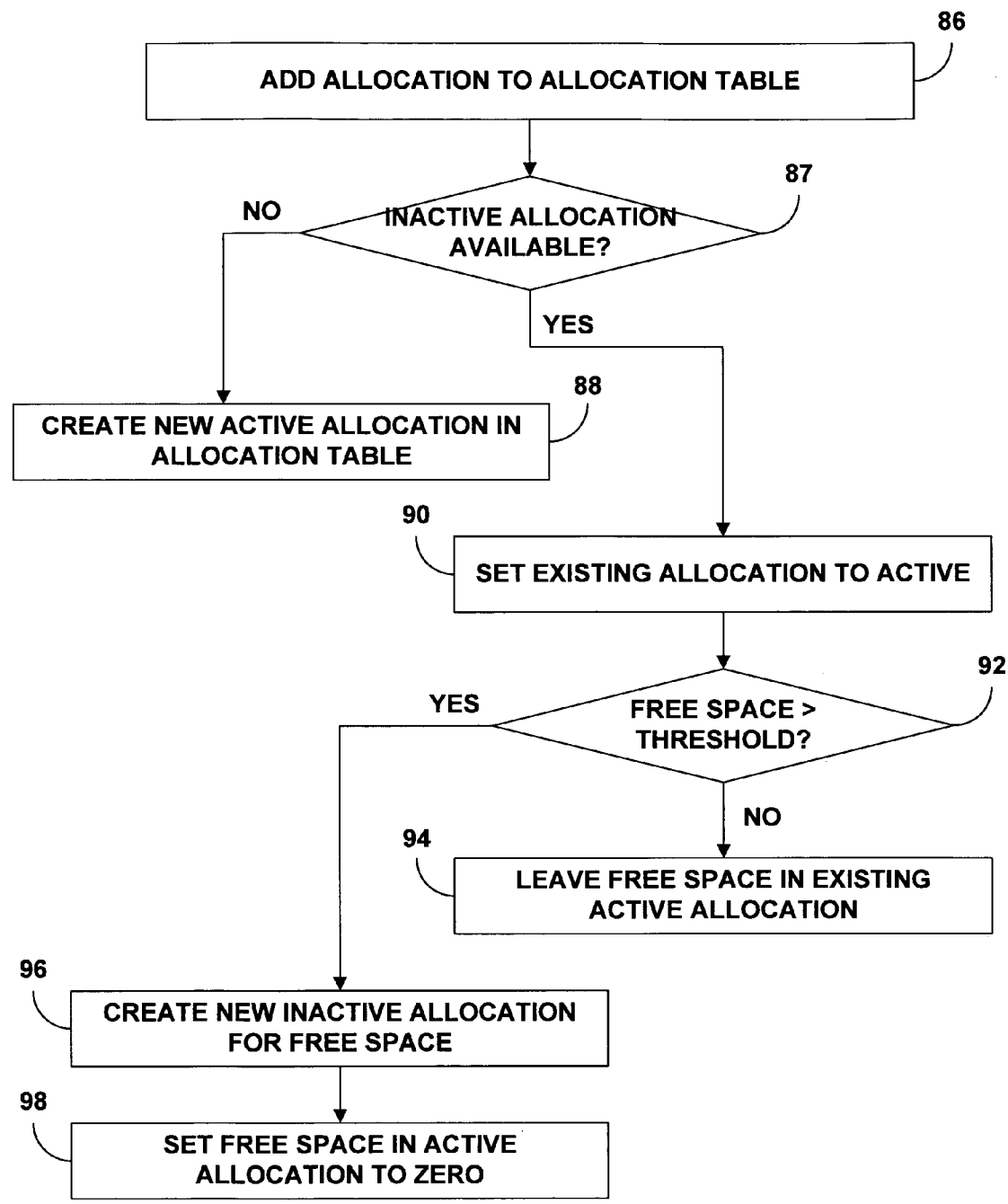
FIG. 8 is a flowchart illustrating exemplary operation of the allocation table from FIG. 7.

FIG. 7 illustrates an exemplary allocation table 80 of a cache, as described herein, which manages space allocation for a corresponding object store. FIG. 8 is a flow chart illustrating exemplary operation of allocation table 80 from FIG. 7. Allocation table 80 may operate substantially similar to allocation table 32 from FIG. 3. In the illustrated embodiment, allocation table 80 includes two allocations, first allocation 82 and second allocation 83. Allocations 82 and 83 may each comprise any of a key object, a data object, or a metadata object.

Allocations 82, 83 include a set of properties associated with the allocation. As shown in FIG. 7, the set of properties may include an offset of the allocation from first allocation 82, a size of the allocation, an amount of free space in the allocation, and an indication of whether the allocation is active or inactive. In this example, the active indication comprises a boolean flag. First allocation 82 is an inactive allocation of size 100. Second allocation 83 is an active allocation of size 50 and has an offset from first allocation 82 of 100.

Referring to FIG. 8, assume a planning application initially adds an allocation of a certain size to allocation table 80 (86). If there are no inactive allocations within allocation table 80 large enough to accommodate the new allocation (no branch of 87), allocation table 80 creates a new active allocation (88). For example, as illustrated in FIG. 7, when a planning application inserts a size 200 allocation in allocation table 80, allocation table 80 creates a third allocation 84 since the inactive first allocation 82 is not large enough to accommodate the size of the new allocation. Third allocation 84 is an active allocation of size 200 with an offset from first allocation 82 of 150.

If allocation table 80 does comprise an inactive allocation large enough to accommodate the new allocation, (yes branch of 87), allocation table 80 sets the existing allocation to active (90). However, the existing allocation may be a larger size than required by the new allocation. In that case, the allocation contains free space. When the free space in an allocation is less than a re-allocation threshold (no branch of 92), allocation table 80 leaves the free space in the allocation (94).

For example, as illustrated in FIG. 7, a planning application may insert an allocation of size 75. In this example, first allocation 82 is large enough to handle the new allocation. First allocation 82 then becomes an active first allocation 82A of size 75 with 25 units of free space. Allocation table 80 may comprises a re-allocation threshold of 50, for example. Therefore, allocation table 80 keeps the free space in first allocation 82A.

When the free space in an allocation is greater than the re-allocation threshold (yes branch of 92), allocation table 80 creates a new inactive allocation for the free space (96). As an example, a planning application may insert an allocation of size 25, as illustrated in FIG. 7. Again, first allocation 82 is large enough to handle the new allocation. In this case, first allocation 82 becomes an active first allocation 82B of size 25 with 75 units of free space. Since allocation table 80 comprises a re-allocation threshold of 50, allocation table 80 creates a fourth allocation 85 for the free space from first allocation 82B. Fourth allocation 85 is an inactive allocation of size 75 with an offset from first allocation 82B of 25. The free space within active first allocation 82B is then set to zero (98).

As illustrated in FIG. 7, the allocations within allocation table 80 are not necessarily in order based on the offset value. Instead, each allocation comprises an ordinal, as discussed above, which only changes when a collapse is executed on the cache as a clean-up mechanism.

The allocation process described above provides an efficient use of space in the cache. The re-allocation threshold is used to control whether a new allocation for the free space is created within an existing allocation. Since caches are generally geared toward large blocks of data, smaller allocations, i.e., allocation below the re-allocation threshold, are kept in the original allocation. The allocation efficiency of the caching management techniques described herein may reduce how frequently the cache needs to be collapsed. A collapse of the cache may tend to disrupt the ordinals associated with each allocation. Therefore, any table instances created by the planning applications may require a cold load from the allocation table after a collapse occurs.

Figure 9:
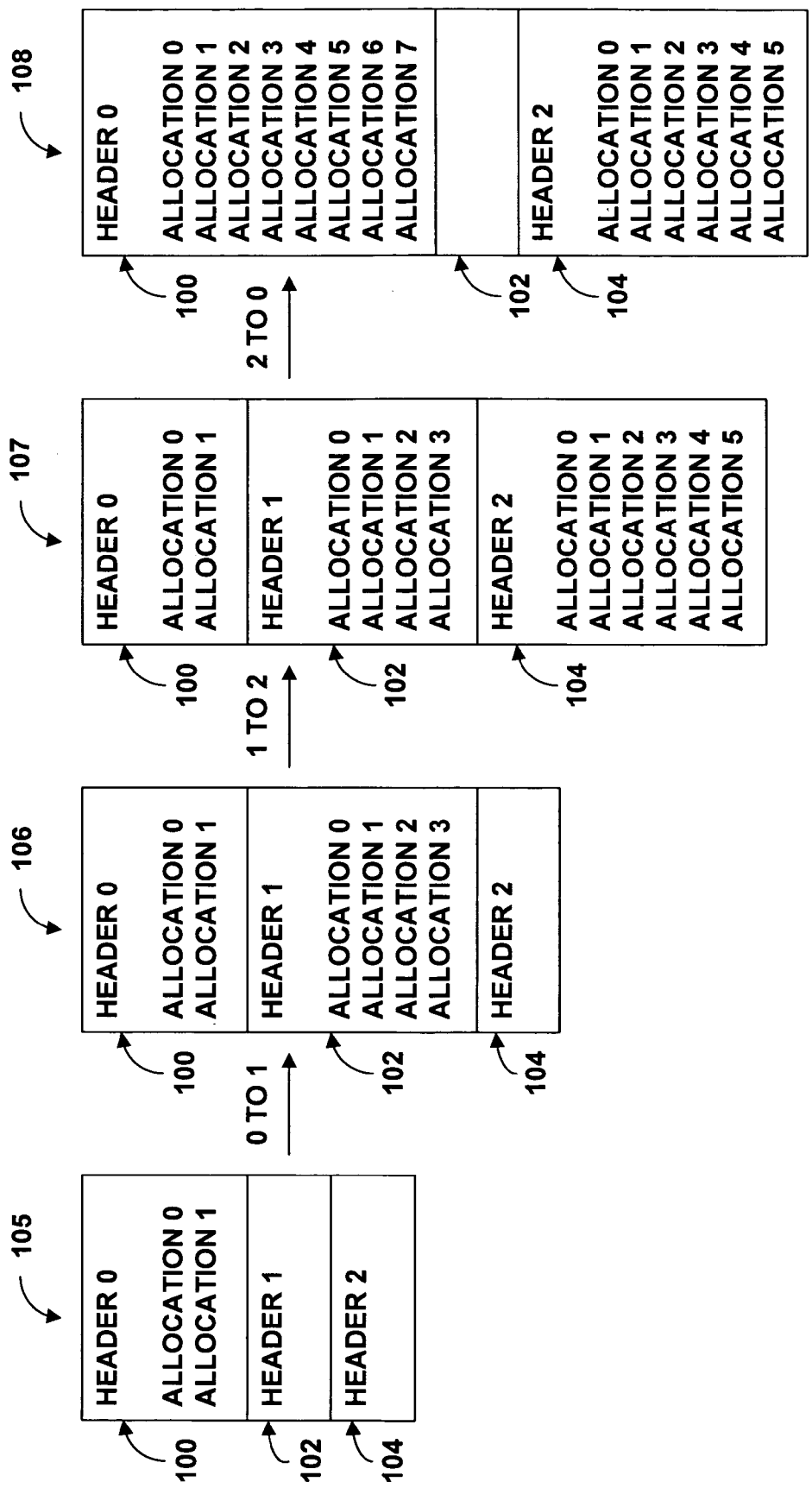
FIG. 9 illustrates an exemplary system of three allocation tables for management of a local cache to provide robust storage.
Figure 10:
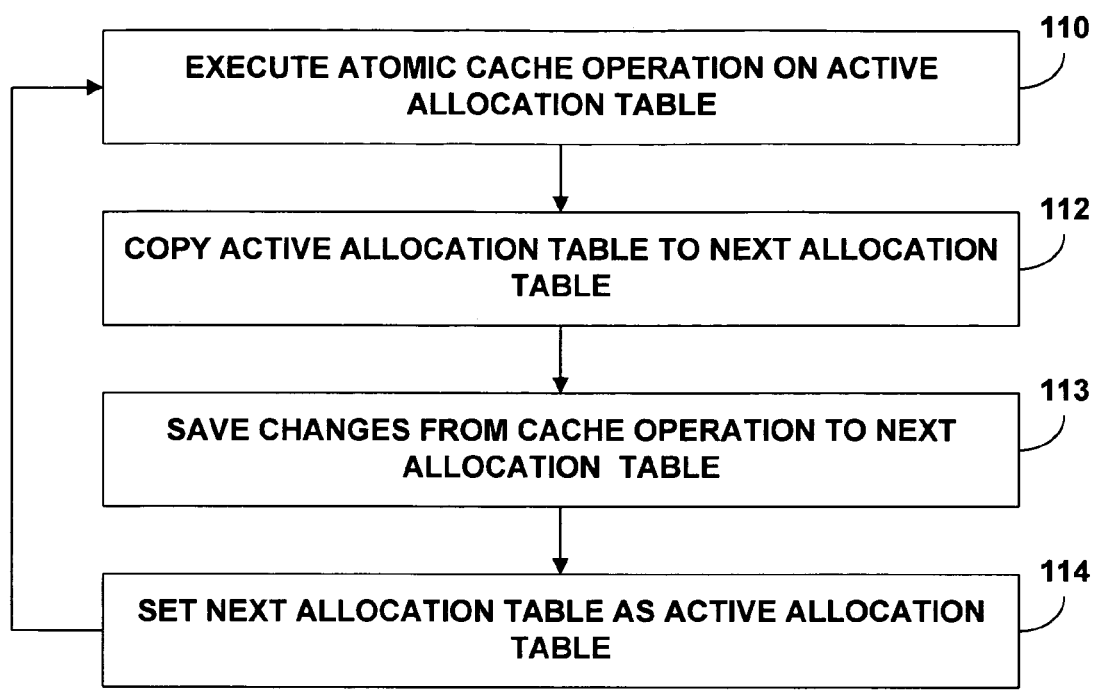
FIG. 10 is a flowchart illustrating exemplary operation of the system of allocation tables from FIG. 9.

FIG. 9 illustrates an exemplary technique for using multiple (i.e., three in this example) allocation tables for managing a cache to provide robust storage for the cache. FIG. 10 is a flow chart illustrating exemplary operation of the system of allocation tables from FIG. 9. In this example, first allocation table 100, second allocation table 102, and third allocation table 104 are illustrated, and may each operate generally similar to allocation table 32 from FIG. 3 and allocation table 80 from FIG. 7. As described further below, the three allocation tables are used on a rotational basis to provide a robust storage system. Specifically, the allocation tables are used in a manner that automatically preserves a copy of the previously used allocation table while updating the current allocation table.

In particular, only one of allocation tables 100, 102, and 104 is active during a given period. The header associated with each of the allocation tables 100, 102, and 104 may comprise a byte that switches to selectively set the respective allocation table as the active allocation table.

In this embodiment, allocation table manager objects 36 employ cache management techniques that automatically select a new allocation table each time an atomic operation is executed on the current table. A single atomic operation may append no more than two allocations to an allocation table. In the case of period 105, a previous atomic operation has resulted in allocation 0 and allocation 1 being appended to first allocation table 100.

During period 105, for example, first allocation table 100 is active, and a planning application may execute an atomic cache operation on the active allocation table (110 of FIG. 10). As a result, allocation table manager objects 36 copy the currently active table (i.e., allocation table 100) to the next allocation table (i.e., allocation table 102) (112). In this case, the two current allocations within first allocation table 100 are copied to second allocation table 102.

Allocation table manger objects 36 then save any changes occurring from the atomic cache operation executed on currently active allocation table 100 to second allocation table 102 (113). In the case of period 105, the atomic operation has resulted in allocation 2 and allocation 3 being appended to second allocation table 102. In this way, the cache management techniques ensure that the currently active allocation table remains intact. Next, allocation table 102 is set as the active allocation table (114).

In the example of FIG. 9, during period 106, second allocation table 102 is the active table. The robust storage process continues in a cyclical fashion. For example, during period 106 the cache is accessed, causing currently active allocation table 102 to be copied to the next allocation table (i.e., third allocation table 104). The cache operation appends allocation 4 and allocation 5 to third allocation table 104. After the execution of the cache operation is completed successfully, third allocation table 104 becomes the active allocation table for use during period 107 and contains all the allocations from second allocation table 102. To continue the example, third allocation table 104 is copied to first allocation table 100. After the atomic operation, allocation 6 and allocation 7 may be appended to first allocation table 100 during period 107. Allocation table manager objects 36 then set first allocation table 100 as the active allocation table during period 108.

As shown in FIG. 9, allocation tables 100, 102 and 104 may be maintained as one contiguous data block in memory, copying third allocation table 104 to first allocation table 100 overwrites first allocation table 100. In addition, appending allocation 6 and allocation 7 to first allocation table 100 during period 107 overwrites second allocation table 102 as well. However, since only two allocations may be appended for each atomic operation, third allocation table 104 cannot be overwritten. In this way, each time the active allocation table is switched, the previous allocation table remains intact. In the case where a power failure or other disruption corrupts the active allocation table, a copy of the previous allocation table is readily available for use in a recovery process.

Various embodiments of the invention have been described. Although described in reference to an enterprise planning system, such as an enterprise financial or budget planning system, the caching techniques may be readily applied to other software systems, including other large-scale enterprise software systems. Examples of other enterprise software systems include order management systems, inventory management systems, sales force management systems, business intelligent tools, enterprise reporting tools, project and resource management systems and other enterprise software systems. Moreover, the techniques may be implemented on any type of computing device, including servers, user computers, laptops or other devices. These and other embodiments are within the scope of the following claims.

The invention claimed is:

1. A computer-implemented system comprising:
a cache that includes an object store to store data and a plurality of allocation tables to manage allocation of storage space in the object store, wherein the allocation tables include an active allocation table and at least one inactive allocation table;
a plurality of software applications executing within an operating environment of a computer, wherein the software applications utilize the active allocation table to access cached data in the object store; and
at least one allocation table manager executing within the operating environment of the computer,
wherein the allocation table manager designates a different one of the allocation tables as the active allocation table after each cache operation by the plurality of software applications.

2. The system of claim 1, wherein the allocation table manager copies the currently active allocation table to a different one of the allocation tables and saves changes to the allocation table copy when one of the plurality of software applications executes a cache operation on the currently active allocation table.

3. The system of claim 2, wherein the plurality of allocation tables are stored as contiguous memory blocks such that at any time at least one of the plurality of allocation tables stores a copy of the previously active allocation table.

4. The system of claim 1, wherein the plurality of allocation tables includes N allocation tables, and the allocation table manager appends no more than N−1 allocations to a different one of the allocation tables before designating the different one of the allocation tables as the active allocation table.

5. The system of claim 1, wherein the cache operation comprises one of an allocation insert, an allocation remove, an allocation update, an allocation select, or an allocation table collapse.

6. The system of claim 1, wherein the cache operation comprises an atomic operation.

7. The system of claim 1, wherein the object store is stored on a persistent computer-readable medium.

8. The system of claim 1, wherein the plurality of allocation tables comprises three allocation tables consisting of the active allocation table and two inactive allocation tables.

9. The system of claim 1, wherein the object store includes a plurality of allocations, wherein each allocation stores data, metadata or a key.

10. The system of claim 9, wherein each key includes a link table to associate the key with a respective one of the data allocations.

11. The system of claim. 10, wherein the link table of each key includes entries to associate the key with one or more metadata allocations.

12. The system of claim 1, further comprising an allocation table manager class, wherein each of the plurality of software applications instantiates a respective allocation table manager object of the allocation table manager class, and the allocation table manager object exposes an application programming interface (API) to communicate with the cache.

13. The system of claim 12, wherein the allocation table manager objects connect the corresponding software application to the cache, create an instance of the active allocation table from the cache, and execute a cache operation from the corresponding software application based on the table instance.

14. The system of claim 1, further comprising:
a remote database system storing modeling data defining a plurality of nodes, and enterprise planning data associated within each of the nodes,
wherein the software applications comprise enterprise planning software applications that access the enterprise planning data and perform an enterprise planning session, and
wherein the cache stores the enterprise planning data retrieved from the remote database system for use by the enterprise planning software applications.

15. A method comprising:
storing data in an object store of a cache on a computing device;
managing allocation of storage space in the object store with a plurality of allocation tables, wherein the allocation tables comprise an active allocation table and at least one inactive allocation table;
executing a plurality of software applications on the computing device, wherein the plurality of software applications utilize the active allocation table to access cached data in the object store; and
switching the active allocation table to a next one of the allocation tables after a cache operation by one of the plurality of software applications.

16. The method of claim 15, wherein switching the active allocation table comprises:
copying allocations listed in the active allocation table to the next one of the allocation tables;
saving changes from the cache operation to the next one of the allocation tables; and
setting the next one of the allocation tables as the active allocation table.

17. The method of claim 15, wherein executing a cache operation from one of the plurality of software applications comprises appending up to two allocations to the next one of the allocation tables.

18. The method of claim 15, wherein each of the plurality of software applications instantiates a respective allocation table manager object of an allocation table manager class, the method further comprising:
sending a connect message to the allocation table manager object to connect the corresponding software application to the cache;
creating an instance of the active allocation table with the allocation table manager object; and
executing a cache operation from the corresponding software application based on the table instance.

19. The method of claim 15, further comprising:
storing modeling data defining a plurality of nodes of an enterprise;
storing enterprise planning data associated within each of the nodes;
executing an enterprise planning session with the software applications using the enterprise planning data; and
storing the enterprise planning data retrieved from a database system in the cache for future use by the software applications.

20. A method comprising:
storing data in an object store of a cache on a computing device;
managing allocation of storage space in the object store with a plurality of allocation tables, wherein the allocation tables comprise an active allocation table and at least one inactive allocation table, and wherein the active allocation table includes a global unique identifier (guid);
executing a plurality of software applications on the computing device, wherein the plurality of software applications utilize the active allocation table to access cached data in the object store, and wherein each of the plurality of software applications instantiates a respective allocation table manager object of an allocation table manager class;
sending a connect message to the allocation table manager object to connect the corresponding software application to the cache;
creating an instance of the active allocation table with the allocation table manager object;
executing a cache operation from the corresponding software application based on the table instance;
switching the active allocation table to a next one of the allocation tables after a cache operation by one of the plurality of software applications;
changing the guid of the active allocation table when updating the active allocation table;
comparing the guid associated with the active allocation table to a guid associated with the table instance before executing the cache operation; and
updating the table instance when the identifiers are not equal.

21. The method of claim 20, wherein the allocation table comprises a list of the allocations in the object store and each of the allocations includes a guid, the method further comprising:
updating the respective guid when modifying the corresponding allocation;
comparing the guid associated with each of the listed allocations to a guid associated with a corresponding allocation in the table instance; and
updating the corresponding allocation within the table instance when the guids are not equal.

22. A computer-readable medium comprising instructions that cause a programmable processor of a computing device to:
store data in an object store of a cache on a computing device;
manage allocation of storage space in the object store with a plurality of allocation tables, wherein the allocation tables comprise an active allocation table and at least one inactive allocation table;
execute a plurality of software applications on the computing device, wherein the plurality of software applications utilize the active allocation table to access cached data in the object store; and
switch the active allocation table to a next one of the allocation tables after a cache operation by one of the plurality of software applications.

23. A computer-implemented system comprising:
a cache that includes an object store and an allocation table, wherein the object store stores data allocations and key allocations, and each of the key allocations includes a link table to associate the respective key allocation with one of the data allocations, wherein the allocation table comprises an active one of a plurality of allocation tables within the cache;
a plurality of software applications that utilize the allocation table to access the cached data in the object store; and
an allocation table manager that designates a different one of the allocation tables as the active allocation table on a rotational basis after each cache operation by the plurality of software applications.

24. The system of claim 23, wherein the object store stores metadata allocations and the link table of each key allocation includes entries to associate the respective key allocation with one or more metadata allocations.

25. The system of claim 23, wherein the object store is stored on a persistent computer-readable medium.

26. The system of claim 23, wherein the link table within each of the key allocations comprises allocation table ordinals for the key allocation and the data allocation.

27. The system of claim 23, wherein the allocation table manager copies the currently active allocation table to one of the plurality of allocation tables and saves changes to the allocation table copy when one of the plurality of software applications executes a cache operation on the currently active allocation table.

28. The system of claim 23, further comprising:
a remote database system storing modeling data defining a plurality of nodes, and enterprise planning data associated within each of the nodes,
wherein the software applications comprise enterprise planning software applications that access the enterprise planning data and perform an enterprise planning session, and
wherein the cache stores the enterprise planning data retrieved from the remote database system for use by the enterprise planning software applications.

29. A method comprising:
storing data in an object store of a cache on a computing device;
storing a key in the object store of the cache, wherein the object store stores the data and the key as separate allocations and the key allocation includes a link table to associate the key allocation with the data allocation;

managing the allocations in the object store with an allocation table of the cache; and executing a plurality of software applications on the computing device, wherein the software applications utilize the allocation table to access the cached data in the object store; and switching from the allocation table to a next allocation table after a cache operation by one of the plurality of software applications.

30. The method of claim 29, further comprising storing metadata in the object store as separate allocations, wherein the link table associates the key with one or more of the metadata allocations.

31. The method of claim 29, wherein each of the plurality of software applications instantiates a respective allocation table manager object of an allocation table manager class, the method further comprising:

sending a connect message to the allocation table manager object to connect the corresponding software application to the cache;

creating an instance of the active allocation table with the allocation table manager object; and accessing the cached data requested by the corresponding software application based on the table instance.

32. The method of claim 29, further comprising:

storing modeling data defining a plurality of nodes of an enterprise;

storing enterprise planning data associated within each of the nodes;

executing an enterprise planning session with the software applications using the enterprise planning data; and storing the enterprise planning data retrieved from a database system in the cache for future use by the software applications.

33. A method comprising:

storing data in an object store of a cache on a computing device;

storing a key in the object store of the cache, wherein the object store stores the data and the key as separate allocations and the key allocation includes a link table to associate the key allocation with the data allocation;

managing the allocations in the object store with an allocation table of the cache; and executing a plurality of software applications on the computing device, wherein the software applications utilize the allocation table to access the cached data in the object store by:

traversing the object store to find a desired key allocation;

reading the link table of the desired key allocation to determine an allocation table ordinal of the corresponding data allocation;

locating the corresponding data allocation listing in allocation table based on the ordinal; and using an allocation offset included in the data allocation listing to recover the data from the object store.

34. A computer-readable medium comprising instructions that cause a programmable processor of a computing device to:

store data in an object store of a cache on a computing device;

store a key in the object store of the cache, wherein the object store stores the data and the key as separate allocations and the key allocation includes a link table to associate the key allocation with the data allocation;

manage the allocations in the object store with an allocation table of the cache;

execute a plurality of software applications on the computing device, wherein the software applications utilize the allocation table to access the cached data in the object store; and switch from the allocation table to a next allocation table after a cache operation by one of the plurality of software applications.

35. An enterprise planning system comprising:

a remote database system storing modeling data defining a plurality of nodes, and enterprise planning data associated within each of the nodes; and a computing device that includes a plurality of enterprise planning software applications and a cache that comprises an object store and an allocation table; and an allocation table manager executing within an operating environment of the computing device, wherein the allocation table manager switches to a next one allocation table after each cache operation by the plurality of planning software applications, wherein the enterprise planning software applications access the enterprise planning data and perform an enterprise planning session, and wherein the cache stores the enterprise planning data retrieved from the remote database system for use by the enterprise planning software applications.

* * * * *